Figure 1:
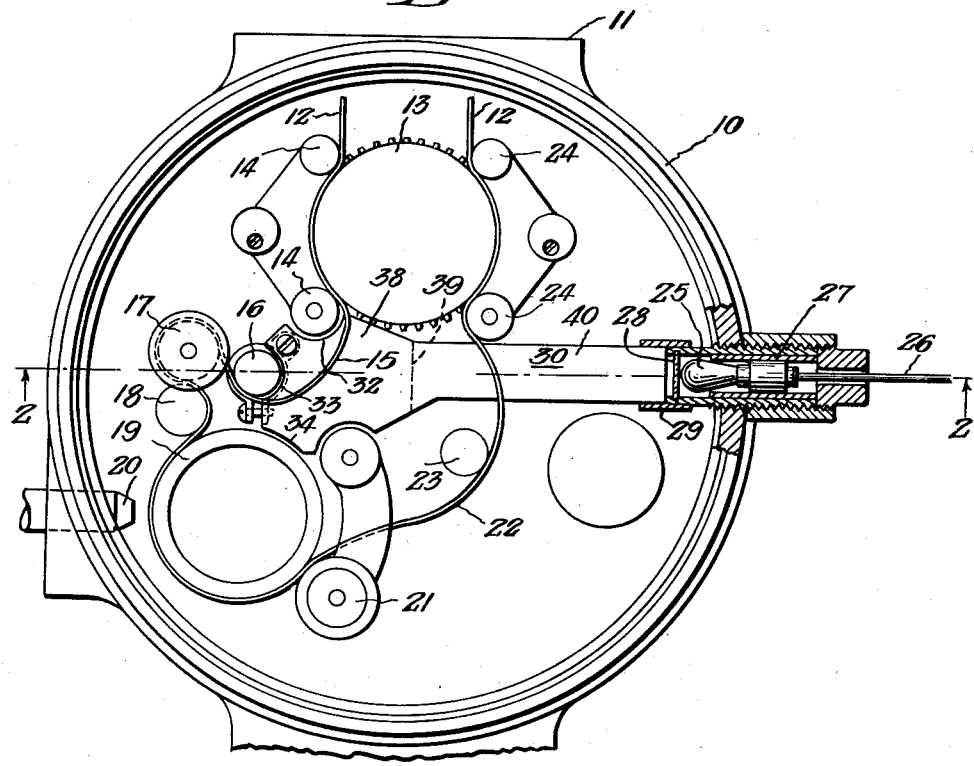

Jan. 2, 1940.  E. W. KELLOGG ET AL  2,185,252

DEVICE FOR VIEWING PHOTOGRAPHIC FILM

Filed March 18, 1937

Inventors
EDWARD W. KELLOGG
DANIEL O. LANDIS

By

Attorney

Patented Jan. 2, 1940

2,185,252

UNITED STATES PATENT OFFICE 2,185,252

DEVICE FOR VIEWING PHOTOGRAPHIC FILM

Edward W. Kellogg, Moorestown, N. J., and Daniel O. Landis, Upper Darby, Pa., assignors to Radio Corporation of America, a corporation of Delaware Application March 18, 1937, Serial No. 131,548

8 Claims. (Cl. 88—1)

This invention relates to a device for viewing photographic film in a photographic sound recorder, or similar apparatus, such, for example, as motion picture cameras.

In photographic sound recorders, such as that described and claimed in Patent No. 1,899,571, issued to one of the present applicants, it is customary to provide a loop of film above and below the sound recording point. In these and other machines wherein the film is passed over a roller or drum not provided with sprocket teeth, the relative length of film in the loops on either side of the drum is dependent on certain adjustments, and dependent also in part on such factors as bearing friction, which are somewhat variable and may change during operation. At the same time, it is important for best operation that the amount of film in these loops be maintained between certain limits. The adjustments which determine the relative lengths of the film loops, or the tension on one or the other of the loops can best be made if one of the loops can be seen. In other forms of film moving equipment, it is likewise desirable to be able to see the loop of film between certain rollers or operational points, for example.

In motion picture cameras, it is customary to provide a film loop above and below the intermittent feed mechanism. In the operation of these devices, it occasionally happens that, due to a poorly made splice in the film, some irregularity in its sprocket hole perforations, or other defects in the material, or in the operation of the apparatus, one or both of these loops will be lost, causing the film to be drawn taut between the operational point and the next preceding or succeeding driving element, thereby impairing the operation of the mechanism.

Due to the fact that the film is sensitive to the light, it is impossible to leave the mechanism so opened as to permit viewing of the film in its travel therethrough and, therefore, it occasionally happens that hundreds of feet of film are lost, and it is necessary to retake entire scenes at correspondingly great expense, due to the impossibility of immediately discovering such faulty operation. Although the apparatus may not be opened during operation for inspection of film loops, it is permissible in many cases, especially if the film is not panchromatic, to subject it to a subdued, non-actinic light, sufficient to make it visible. The loop of film may then be observed through a suitably positioned window. Such a window may be so shielded that it will admit very little light into the film compartment, and may furthermore be fitted with a ruby glass or other appropriate filter whereby the light transmitted will be limited to a portion of the visible spectrum which has little or no effect on the film. Mechanical loop indicators have been employed, but these involve the employment of a feeler or contacting device against which the film runs, and do not give as satisfactory an indication as can be obtained if the loop may be observed visually.

The present invention relates to an apparatus for enabling the operator of the apparatus to see the film loops, without deleteriously affecting the film.

One object of our invention is to provide means for viewing the photographic film within a darkened mechanism enclosure.

Another object of our invention is to provide means for viewing a photographic film with a minimum of illumination of the film itself, and therefore without injuriously affecting the emulsion thereof.

Another object of our invention is to provide means for giving a continuous indication of the operative condition of the film-feeding apparatus.

Another object of our invention is to provide an illuminated background against which the film appears in silhouette.

Another object of our invention is to provide such an illuminated background in a mechanism enclosure of limited space.

Another object of our invention is to provide illumination in the desired region for rendering a film loop visible, employing a remotely located lamp.

Another object of our invention is to provide a novel illuminating means for film handling apparatus.

Figure 2:
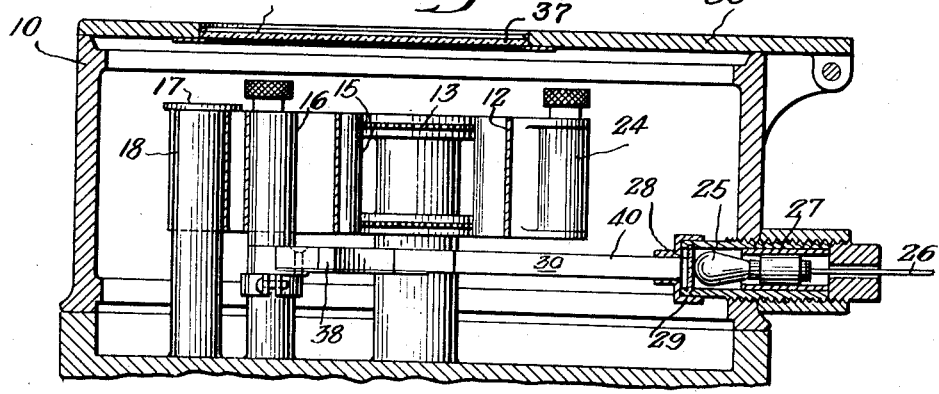

Other and incidental objects of our invention will be apparent to those skilled in the art from a reading of the following specification and an inspection of the accompanying drawing, in which:

Figure 1 is a side elevation of a commercial sound recorder built in accordance with the aforesaid Patent No. 1,899,571, and showing the film-illuminative apparatus in accordance with the present invention, and Fig. 2 is a transverse section on the line 2—2 of Fig. 1 and looking upwardly.

In the sound recorder illustrated herein, a more or less cylindrical housing 10 is provided, which carries an appropriate seal 11 for a film magazine. The film 12 passes downwardly from the magazine around the sprocket 13 against which it is held by appropriate pad-rollers 14 and is drawn into a loop 15 between the lower of said pad-rollers and the first guide roller 16. From the guide roller 16 it passes around the guide rollers 17 and 18 to the magnetically driven film drum 19, which carries it past the recording optical system 20. The film is held against the drum 19 by the spring-pressed roller 21 and then passes upwardly in the loose loop indicated at 22, past the guide roller 23 to the pad-rollers 24, which hold it against the sprocket 13 on the exit side of the apparatus in the same manner as the rollers 14 hold it on the entrance side.

It will be apparent from the drawing that there are two loops of film provided at 15 and 22. The recording machine is operated under such conditions that the drum 19 exerts a forward pull on the film, whereby the film in loop 15 is under a slight tension, while loop 22 is entirely loose. In loop 15, where the film is bent into a curve around the lower pad-roller 14 and the first guide roller 16, the amount of curvature is determined by the tension and by the flatwise elasticity of the film. If the tension produced by the drum 19 becomes too great, the loop 15 will be drawn nearly flat, under which conditions the loop loses much of its flexibility, and this causes to be transmitted to the film, at the recording point or drum, such irregularities in speed as are present in the rotation of the sprocket 13, or irregularities resulting from the sprocket teeth or from the sprocket holes of the film passing thereover. On the other hand, if the torque provided at the drum 19 is not great enough, the loop 15 will become too large, thereby preventing proper guiding of the film, while loop 22 will be drawn taut, thereby similarly causing irregularities to be transmitted to the film at the recording point from the off-side of the sprocket 13. It has heretofore been necessary to make the adjustments which control the driving torque applied to drum 19 by a preliminary test, and it has not been possible to check the condition of the loops during operation. Our viewing device, however, permits the film to be viewed during operation without exposing it sufficiently to produce any fog. In our viewing device as applied to the recorder above described, we provide a small opening 36 in the front wall (or door) 35 of the mechanism enclosure, through which the operator may observe the film loop, and we provide such illumination within the film compartment as is necessary to render said loop visible. The viewing window may be provided with a hood to minimize the amount of light which may enter as a result of the general illumination outside, and is fitted with a ruby glass 37. The window may furthermore be provided with a shutter which can be pushed aside whenever the operator wishes to observe the loop, but which will otherwise be closed so that no light can accidentally reach the film through the window. We may provide a switch so that the illumination will be supplied when needed for making an observation of the loop, and we may provide that the opening of the shutter and the closing of the light switch are effected by a single control or a single act on the part of the operator.

Our invention pertains especially to the arrangements for providing the illumination. Although some films are very insensitive to suitably filtered red light, an excess of such light may cause fog, and it may be desirable for certain purposes to employ films which are quite easily fogged by too much red light. The obvious way to render the film loop visible would be to illuminate it sufficiently to make it appear white (or relatively light) against a black background. Since some films are dyed or may have dark anti-halation backing, a fairly strong light may be required to make them appear light or luminous as seen through the window. Our method of rendering the film visible subjects it to far less light, in that the film appears black against a luminous background. With this arrangement, the background itself need only be illuminated sufficiently to make it visible, and the light on the film, which is only what it unavoidably receives from the background, is very much less than that of the background.

Our arrangements for providing the desired luminous background are illustrated in Figs. 1 and 2. As a source of light we employ an electric lamp 25 to which current is fed by the wires 26. This lamp is mounted in an appropriate socket 27 fitted into the recorder casing. The socket 27 is tubular in form and completely encloses the lamp bulb, preventing any stray light from passing to the interior of the casing. The inner end of this tubular socket is provided with a color screen 28, which may be of an appropriately colored glass or of tinted gelatine or other appropriate material which permits only non-actinic light rays to pass. For use with ordinary sound recording film, which is sensitive primarily to the blue end of the spectrum, ruby glass is quite satisfactory. If, however, film is to be used having a greater range of sensitivity, an appropriately colored filter material must be used. Adjacent the color filter there is provided an appropriate fitting 29 connecting the tubular end of the socket 27 with the light-conveying member 30. In the form of the invention shown herein, this light-conveying member 30 is composed of a plane parallel strip of transparent material having its edges cut to an appropriate configuration. The material used may be glass, Celluloid, fused quartz, or any of the transparent phenolic condensation products. A material which is particularly convenient to use, due to the fact that it is not readily broken, is easy to fabricate, and is highly transparent, is that which is commercially known as Du Pont "Pontolite", but, as before stated, any clear transparent material may be used.

The member 30 may be considered as consisting of two portions which perform different functions. The portion 38 to the left of the line 39 provides the luminous screen or background against which the film loop is viewed, while the part 40, to the right of line 39, serves to conduct light from the lamp to the screen portion 38. It is well known that a rod of highly transparent material may be used to transmit light in a direction parallel to its axis, and that this transmission takes place with very little escape of light through the surfaces. The reason for this is that nearly all of the light which strikes the surfaces does so at grazing incidence, or at such an acute angle that complete internal reflection takes place. Such reflection is accompanied by very little loss. A ray of light striking one surface is reflected, crosses diagonally, strikes the opposite surface, and is again reflected, thus zigzagging its way along the rod until it reaches the end, where it may emerge if not obstructed, since it strikes the end surface more nearly normal to that surface. A similar transmission of light may be obtained by use of a tube, the interior surface of which is polished and silvered or otherwise provided with highly reflecting surface. The substitution of such a tube with highly reflecting interior surface, for the transmitting portion 40 of the transparent rod 30, would be an obvious modification of our invention. The walls of the transmitting portion 40 of the rod 30 might be silvered, but this results in loss rather than gain in reflecting power, and is inadvisable except in cases where the surfaces are likely to become oily or dirty. The fact that little light escapes through the walls of the rod 40 is favorable to the avoidance of film fogging, for it is desirable to radiate into the recording compartment only such light as will be useful in rendering the film visible, namely, light emanating from the desired screen or background area, and radiating toward the viewing window in the front or door of the compartment. This ideal limitation of the light cannot be fully attained, but is better approximated in our invention than by any of the previous methods of providing illumination sufficient to render the loop visible. Were abundance of space available behind the film loop, a system of illumination might be provided by employing a small lamp with either a concave reflector, or a condensing lens arranged to throw a concentrated substantially parallel beam of light past the film loop, into the viewing window, the lens or mirror being of sufficient size to provide a background for the film loop. This construction is described for the purpose of illustrating the type of light distribution which would give the film the minimum exposure while still rendering it visible. Actually, in most cases it is not important to go to this extreme, but it is highly desirable to minimize the exposure to unnecessary light, as we have done.

Having transmitted the light from the lamp to the region in which the luminous background is desired, we must provide means for distributing this light over the necessary background area. The difficulty of accomplishing this is increased by the very limited space available in the direction normal to the background surface, and the fact that the extent of the background considerably exceeds the maximum transverse dimension of the transmission bar portion 40 of the transparent member 30. The actual contour of the screen 38 shown in our illustration is dictated by the desirability of providing a background behind as much of the loop as possible, while avoiding interference with certain obstructions in the machine as already designed and built. For distributing the light we have taken advantage of the fact that white paints are available which diffusely reflect a very high proportion (of the order of 90% or more) of the light which strikes them. If the entire end or screen portion 38 of member 30 were painted with such a diffusely reflecting white paint, the light transmitted into this screen portion from the rod portion 40 would in part strike the front and back surfaces, from which it would be reflected in random directions, but the major part of the light would first strike the painted edges 32, 33 and 34 opposite the transmitting portion, and from these edges be reflected in random directions. Wherever the light strikes, it is reflected in new directions with little absorption, and is re-reflected and again changed in direction every time it strikes a boundary surface. In this process of multiple reflections, the light becomes thoroughly diffused throughout the enclosed space, and the result is that all parts of the walls receive a share of light. Owing to the fact that the index of refraction of the pigment carrier (for example, linseed oil, cellulose nitrate, or other well known materials) does not differ greatly from that of the transparent member 30 to which the paint is applied, there is little specular reflection at the interface, and it is not necessary to roughen the member before painting, in order to render the surfaces diffusely reflecting.

It is, of course, necessary to make the white coating on the front surface of the screen portion 38 thin enough to permit the escape of a certain fraction of the light, for only thus can the member be made to appear luminous from this direction. We have found by experiment that it is not necessary (at least when the enlargement of the screen portion is no greater than in the form illustrated) to apply any paint to the front surface. A large fraction of the light reaching the front surface does so at such an acute angle that it does not escape, but is returned to the painted back or edge surfaces, where it is again diffusely reflected. Thus the condition of numerous successive reflections with many changes in direction is attained, whereby a substantially uniform distribution of light within the space is secured. The light coming from the back surface, which reaches the front surface nearly normal thereto, escapes, and this light is in the desired direction to make the screen appear bright as seen from the viewing window. On the other hand, light emanating from the back surface at acute angles cannot escape through the front surface, but is reflected back again to undergo further diffusion.

The diffusely reflecting coating on the surfaces of the transparent member 30 may be of any convenient material, such as white paint, although, of course, for use with red light, any material having high reflection in the red end of the spectrum would be satisfactory, such, for example, as orange or red paint.

It will be thus apparent that we have provided means for viewing the film loops which permits their ready inspection at all times and without exposing the film to any light which might produce an injurious effect thereon.

Having now described our invention, we claim:

1. A device for making a photosensitive object visible, comprising a body of transparent material located behind the said photosensitive object, a portion of the surfaces of said transparent body being treated to render them diffusing but highly reflective to light incident from the interior of said body, and means for introducing light into said body.

2. A device for making a photosensitive object visible, comprising a transparent body including a portion which is positioned behind said photosensitive object and provided with diffusely reflecting surfaces and another portion which is substantially straight and is provided with specularly reflecting surfaces, means for projecting non-actinic light into the end of said straight portion, and means comprising a window fitted with light filter transparent to light of the same color as is introduced into said transparent member.

3. A device for viewing photosensitive objects comprising in combination a light source, a solid light transmitting member for conducting light from said source to the location where the object is to be viewed, a color filter between said light source and said object for transmitting only non-actinic light, the said member being provided with a light diffusing surface over the area where the object is to be viewed.

4. A device for viewing photosensitive objects comprising in combination a light source, a solid light transmitting member for conducting light from said source to the location where the object is to be viewed, a color filter between said light source and said object for transmitting only non-actinic light, the said member being provided with a diffusely reflecting surface over the area where the object is to be viewed.

5. A device for viewing a photosensitive object comprising in combination a light excluding container, a light source, a solid light transmitting member for conducting light from said source to a location behind where the photosensitive object is to be viewed, a color filter between said light source and said object for transmitting only non-actinic light, and a viewing aperture in front of said object having a window transparent only to non-actinic light for permitting observation of said object between said transparent member and said window.

6. A device for viewing a photosensitive object comprising in combination a light excluding container, a light source, a solid light transmitting member for conducting light from said source to a location behind where the photosensitive object is to be viewed, a color filter between said light source and said object for transmitting only non-actinic light, and a viewing aperture in front of said object having a window transparent only to non-actinic light for permitting observation of said object between said transparent member and said window, said light transmitting member being provided with reflecting surfaces for preventing the escape of light in undesired directions, and being provided with means for causing light to diffusely emerge in the direction toward the said photosensitive object.

7. A device for making a loop of a photosensitive film visible comprising a body of transparent material located behind said loop and extending over the area of said loop, portions of the surface of said body being treated to render them diffusing but highly reflective to light incident from the interior of said body, and means for introducing light into said body, said means including an integral portion of said body having a smaller cross-section than said body portion positioned behind said loop.

8. A device for viewing a loop of photosensitive film within a substantially light-tight housing comprising means for producing an illuminated background behind said film loop with light having a wavelength to which said film is substantially non-sensitive, and means for viewing the silhouette of said film loop through said casing, said last-mentioned means passing the light of said background and substantially preventing light to which said film is sensitive from passing to the interior of said casing.

EDWARD W. KELLOGG.
DANIEL O. LANDIS.